United States Patent [19]

Chamberlain

[11] 3,905,527

[45] Sept. 16, 1975

[54] BUMPER FOR CAMPER SUPPORT VEHICLES

[76] Inventor: Patric N. Chamberlain, 565 Goodwin, Ankeny, Iowa 50021

[22] Filed: Jan. 17, 1974

[21] Appl. No.: 434,213

[52] U.S. Cl............................ 224/42.03 A; 293/69 R
[51] Int. Cl.².................................. B60R 19/02
[58] Field of Search...... 293/69 R, 73; 224/42.03 A, 224/42.03 R, 42.04, 42.05, 42.13, 42.32, 42.41; 312/204, 222, 309, 311

[56] References Cited
UNITED STATES PATENTS

| 731,330 | 6/1903 | Woodruff | 312/309 |
| 1,453,362 | 5/1923 | Loveland | 224/42.41 |
| 2,607,518 | 8/1952 | Cohen | 224/42.41 |
| 3,501,170 | 3/1970 | Da Valle | 293/69 R |
| 3,588,160 | 6/1971 | Reiner | 293/69 R |

FOREIGN PATENTS OR APPLICATIONS

| 601,699 | 3/1926 | France | 224/42.32 |

Primary Examiner—Evon C. Blunk
Assistant Examiner—Robert Saifer
Attorney, Agent, or Firm—Zarley, McKee, Thomte & Voorhees

[57] ABSTRACT

A rear bumper for camper supporting vehicles. The bumper is of rigid construction but has a hollow interior compartment allowing for access thereto and easy storage of tool implements and the like. In addition, the bumper has a step slidably mounted thereon for movement from an extended use position to a nonextended storage position.

6 Claims, 5 Drawing Figures

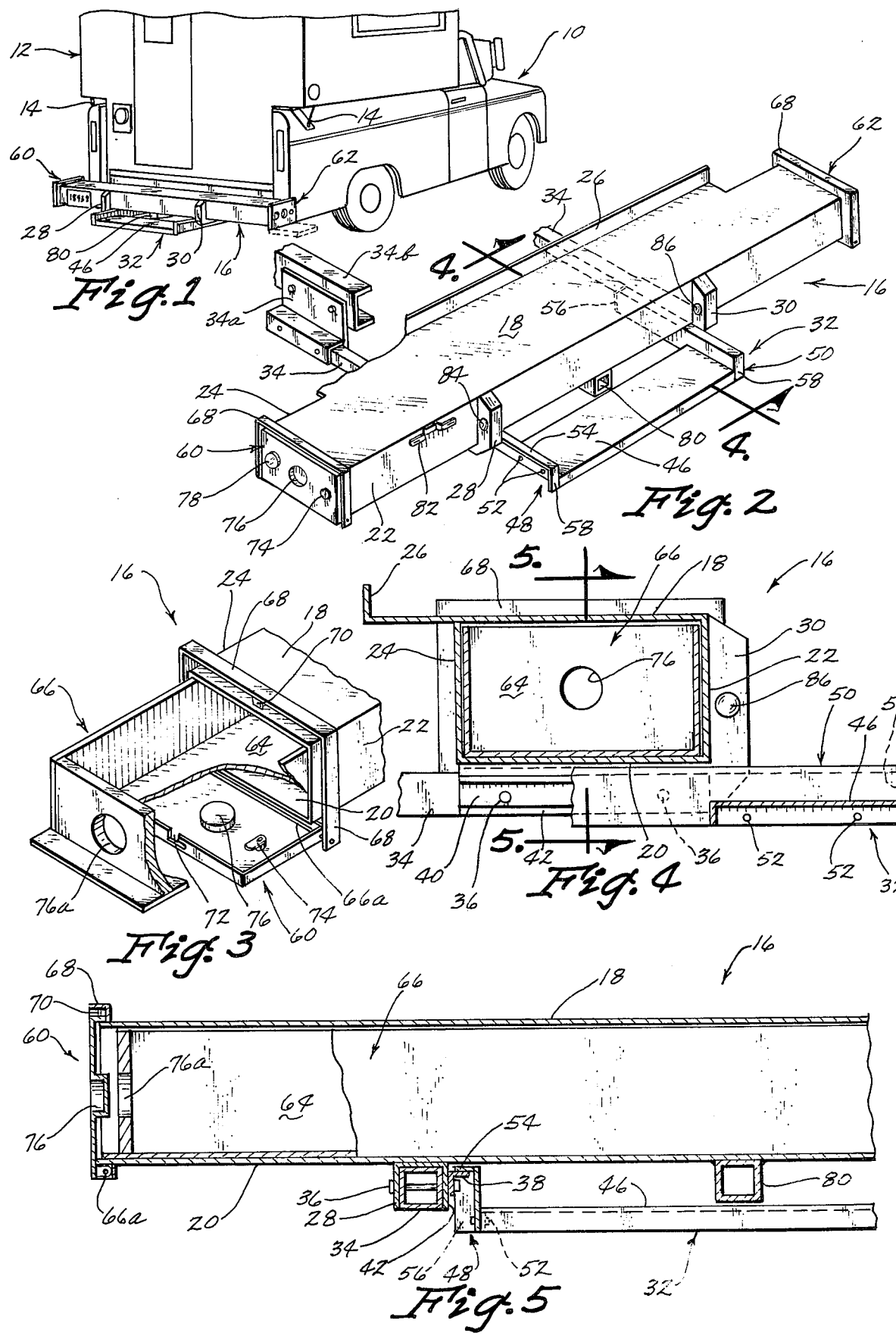

3,905,527

BUMPER FOR CAMPER SUPPORT VEHICLES

BACKGROUND OF THE INVENTION

The ever-increasing popularity of truck-mounted campers is well known. In such devices the camper is mounted in the bed of a pickup truck. Since entrance into the camper is from the rearward end of the vehicle, much more stress is placed upon the rear of the vehicle than during normal in-use operation when a camper is not mounted on the vehicle. Thus, there is a real need for a sturdy rear bumper on vehicles designed for camper mounting.

In addition, it is common to provide an attachment on the rear bumper for a camper entrance step. This is so because the entrance door into the camper is positioned quite high above the ground requiring some means of assistance for entering into the camper. Thus, some sort of entrance step is often employed. Where the entrance step is attached to the rear bumper directly it further increases the need for a sturdy rear bumper and mounting system therefor.

In addition, pickup truck mounted campers are often somewhat cramped on interior storage compartment space. This often presents a problem because a certain amount of tools, implements and the like are necessitated for use during operational use of the camper. This invention provides a sturdy rear bumper for a vehicle adapted to have a camper mounted thereon. In addition to having increased sturdiness the bumper is adapted to have a slidable camper entrance step which can be extended for use and placed in a nonextended position for storage when the step is not needed. In addition, the bumper is provided with an interior compartment for storage of tools, implements and other accessories thereby relieving somewhat the necessity for interior storage space within the camper for such equipment.

Accordingly, it is an object of this invention to provide a sturdy but convenient rear bumper for a vehicle capable of being used for mounting a camper thereon.

Another object of this invention is to provide a rear bumper which has means for attaching a camper entrance step thereto.

Yet another object of this invention is to provide a rear bumper which has an interior storage compartment.

The method of accomplishing these and other objects of the invention will become apparent from the following detailed description of the invention.

BRIEF DESCRIPTION OF THE DRAWINGS

FIG. 1 is a rear perspective view of a typical pickup having a camper mounted thereon, with the pickup, or prime mover, having the bumper of this invention mounted thereon.

FIG. 2 is a perspective view of the bumper of this invention.

FIG. 3 is an exploded end view of the bumper of this invention.

FIG. 4 is a sectional view along line 4—4 of FIG. 2.

FIG. 5 is a sectional view along line 5—5 of FIG. 4 showing in greater detail the means of attaching the bumper of this invention to the frame of the prime mover.

DETAILED DESCRIPTION OF THE INVENTION

In FIG. 1 the prime mover 10 is shown with a camper 12 mounted thereon. A suitable camper tie-down system 14 holds the camper securely to the bed of the prime mover 10. The bumper of this invention, generally depicted as 16 is mounted at the rearward end of prime mover 10 in the normal position of a conventional bumper.

FIG. 2 shows the construction of the bumper 16 of this invention in detail. The bumper 16 is comprised of a bumper frame having top and bottom walls, 18 and 20, respectively, and oppositely disposed side walls, 22 and 24. The forward portion of top wall 18 has a back splash 26 extending vertically therefrom in order to fill the space between top wall 18 of the bumper and the bottom of the camper as most clearly depicted in FIG. 1.

Spaced apart bumper guards 28 and 30 are hollow frame members which extend along the bottom wall 20 and further extend along side wall 22. Bumper guards 28 and 30 thus provide support for the bumper and in addition provide means for attaching said bumper to the vehicle frame members and also provide means for attaching the step 32. The bumper tie-down system and the step attaching means are more particularly shown in FIGS. 2, 4 and 5. As seen in FIGS. 2 and 5, bumper guard 28 is bolted to support bracket 34 by bolt 36. Bracket 34 is attached to support plate 34a, which is mounted to vehicle frame 34b. Of course, other means of attaching bumper guard 28 to vehicle frame 34 can be utilized such as welding and the like. Thus it can be seen that bumper guard 28, once attached to vehicle frame 34b, will provide support for the bumper.

Runners, 38 and 40, are mounted on the interiorly disposed side wall 42 of bumper guards 28 and 30. In the drawing of FIG. 5, runner 38 is mounted on the interior side wall 42 of bumper guard 28 by the same bolt member which attaches bumper guard 28 to bracket 34. Runner 38, as shown in FIG. 5, is positioned in spaced apart relationship from bottom wall 20 of the bumper. Runner 38 thus provides a supporting bracket means for the vehicle step 32.

Vehicle step 32 is preferably of a proper dimension to fill the space between spaced apart bumper guards 28 and 30. Vehicle step 32 comprises a support platform 46 with oppositely disposed step support brackets 48 and 50 mounted on the ends of support platform 46 to provide engaging support with runner members 38 and 40. Support bracket 48 is mounted by suitable means such as bolt 52 to step support platform 46. Support bracket 48 has a horizontally extending runner member 54 which is positioned between the space formed by runner 38 and bottom wall 20 of the bumper. Thus, step 32 is mounted to provide sliding movement with respect to the bumper and step 32 can be moved from an extended use position as shown in FIG. 1 and 2 to a nonextended storage position underneath the bumper 16. Step 32 is prevented from complete removal during sliding to its extended position by stop 56 which engages the runner 38 to stop sliding movement beyond the desired extended position for step 32. Likewise, stop 58 prevents the step 44 from sliding off of runner 38 when the step is placed in a nonextended storage position under bumper 16.

End walls 60 and 62 are of like configuration, and therefore only end wall 60 will be described in detail. The top, bottom and side walls 18, 20, 22 and 24, respectively, of bumper 16 define interior bumper compartment 64. If desired, drawer 66 can be fitted within interior compartment 64.

End wall 60 is designed to be moved from a first closed position to a second open position to provide access to interior compartment 64. With more particularity end wall 60 is pivotally mounted to the ends of bumper 16 to provide pivotal movement from a closed to an open position. As shown in the drawings, end wall 60 is pivotally mounted on shaft 66a. Shaft 66a extends across the bottom of latch bar support bracket 68.

Latch bar support bracket 68 has a latch 70 which engages latch slot 72 to lock end wall 60 in closed position. Shaft 66a is longer than the length of end wall 60 to provide for lateral movement of end wall 60 in order to engage latch slot 72 in a securely locked position. Additionally, end wall 60 has lock 74 which can be moved by a key to engage side wall 22 in order to prohibit the lateral movement of end wall 60 thus prohibiting the disengagement of latch bar 70 and latch slot 72. Thus, end wall 60 can be securely closed.

Certain other constructional features are worthy of mention. End wall 60 has a recessed handle 76 and may have a reflector 78 mounted thereon. Bumper 16 can have a trailer hitch mounting means 80 and a license plate support bracket 82. Bumper guard 28 may have a license plate light 84 mounted thereon and bumper guard 30 may have a safety step light 86. Drawer 66 may have a recessed handle 76a.

As can be seen, the top wall 18 of bumper 16 will function as a second step for easy entrance into camper 12. In addition step 32 can be slidably moved from an extended in-use position to a nonextended out-of-the-way storage position. Moreover, end wall 60 and, if desired, end wall 62 also can be opened to provide access to the interior of bumper 16 which can be used as a storage compartment. Thus the invention accomplishes at least all of its stated objects.

It is to be understood that the specific structure described herein is for purposes of illustration only and that certain modifications can be made therein without departing from the scope of the invention as defined in the following claims.

What is claimed is:

1. A bumper for camper supporting vehicles, trailers and the like, comprising, a bumper frame having top and bottom walls, and oppositely disposed side walls, said frame defining an interior compartment, end walls on each end of said bumper, and at least one of said end walls being movable from closed to open positions to provide access to said interior compartment, means for attaching said bumper to the frame of said supporting vehicle, said one end wall having a horizontally disposed portion extending inwardly from the upper end thereof, said horizontally disposed portion having a first notch formed therein extending into the inner end thereof and a laterally extending second notch extending from the inner end of said first notch, a first latch on said bumper adapted to be received by said first and second notches, said one end wall being pivotally mounted about its lower end to said bumper, said one end being laterally movable with respect to its pivotal axis so that said one end wall may be maintained in its closed position by causing said first latch to be initially received by said first notch and then laterally moving said one end wall so that said first latch is received by said second notch.

2. The bumper of claim 1 wherein said bumper includes a step movably attached thereto capable of being moved from an extended in-use position to a nonextended storage position.

3. The bumper of claim 1 wherein at least one sliding drawer is mounted in said interior compartment.

4. The bumper of claim 1 wherein said end walls are mounted to provide pivotal movement from a closed to an open position to provide access to said interior compartment.

5. The bumper of claim 4 wherein said end wall has a recessed handle means to facilitate opening said end wall and a locking means adapted to lock said end wall to said bumper.

6. The bumper of claim 1 wherein a locking means is mounted on said end wall to lock said first latch in said second notch.

* * * * *